United States Patent [19]

Hluchan et al.

[11] 3,809,971
[45] May 7, 1974

[54] MICROFARAD RANGE VARACTOR

[75] Inventors: Stephen E. Hluchan, Newton; Gerard J. Villani, Needham, both of Mass.

[73] Assignee: Norton Company, Worcester, Mass.

[22] Filed: Mar. 17, 1972

[21] Appl. No.: 235,663

[52] U.S. Cl. .................................. 317/230, 324/60
[51] Int. Cl. ....... H01g 7/06, H01g 9/05, H01g 7/04
[58] Field of Search ..................................... 317/230

[56] References Cited
UNITED STATES PATENTS

| | | | |
|---|---|---|---|
| 3,531,695 | 9/1970 | Bush ................................ | 317/230 |
| 3,308,350 | 3/1967 | Smyth et al. ....................... | 317/230 |
| 3,568,010 | 3/1971 | Maserjian ......................... | 317/230 |
| 3,568,014 | 3/1971 | Schuermeyer .................... | 317/230 X |
| 3,531,382 | 9/1970 | West ................................ | 317/230 X |
| 3,410,766 | 11/1968 | Schmidt ............................ | 317/230 X |

*Primary Examiner*—Rudolph V. Rolinec
*Assistant Examiner*—William D. Larkins
*Attorney, Agent, or Firm*—Oliver W. Hayes

[57] ABSTRACT

A new class of varactors, affording total capacitance in the 0.01 to 1000 microfarad range and above and capacitance change of several percent per volt of bias change, and a total range of capacitance change of over 100%, utilizing thin layer, non-stoichiometric, valve metal oxide dielectrics, modified through materials processing to afford a mixed semiconductive-insulating characteristic, the dielectric being in the form of a thin film sandwiched between electrodes. A mixed anodic oxide coating contained on the surface of a molybdenum-niobium binary alloy electrode is a preferred and distinctly advantageous dielectric. The varactor device of the invention has an oxide film thickness of 20 to 10,000 angstrom units, a capacitance ratio (maximum to minimum capacitance) of at least 2. The invention also comprehends new low frequency control systems incorporating the capability of variable capacitance in response to variation of bias voltage.

9 Claims, 13 Drawing Figures

MICROFARAD RANGE VARACTOR

BACKGROUND OF THE INVENTION

The present application relates to voltage variable capacitance elements — varactors. These are electronic components which vary their capacitance as a function of applied bias voltage.

In the prior art, most varactors are made of silicon or gallium arsenide semiconductor diodes which are designed to maximize the variation of capacitance with the bias voltage. They are of the junction or point contact variety of diodes. The variable capacitance arises from the fact that increasing voltage drop across any semiconductor barrier causes a widening of the charge — depletion region of the barrier.

The semiconductor varactors are intrinsically low capacitance (picofarad range) devices. The capacitance is determined by the ratio of the area of the junction to the thickness of the effective dielectric region. This ratio cannot be increased to give microfarad range capacitance devices within the present state of the art. Conceivably a large number of these devices could be connected in parallel to gain capacitance, but such an arrangement would be impractical, cumbersome, and expensive.

Some specialty varactors are made of thick ferroelectric barium titanate, or extremely thin tunneling-type (up to about 12 Angstroms thick) alumina films or as M.I.S. devices.

The ferroelectric devices can be varied by controlling the dielectric constant of the material through control of the potential gradient across the dielectric. Such varactors require relatively large DC control voltages and are limited in capacitance to an upper limit of about 1 microfarad by the ceramic capacitor technology which necessitates relatively thick layers. Bulk barium titanate dielectric varactors are limited to minimum thicknesses of about 3 mils. The ceramic technology involves deposition of a slurry or paste layer containing oxide particles and firing to final form.

The thin aluminum oxide film device depends on the phenomenon of quantum mechanical tunneling and is limited to low capacitance values (picofarad range). Its operation as a memory unit requires a very low temperature (4.2° Kelvin scale) environment. The oxide layer is produced to a thickness of 10 Angstroms or less to allow tunneling.

M.I.S. devices use variation in the space charge depletion region of a semiconductive layer to vary capacitance and are similar to diode varactors in this respect.

Varactors of the prior art have many uses, including parametric amplifiers and in microwave generators. In microwave applications, varactor diodes with suitable coupling networks are cascaded as frequency multipliers following the oscillator to multiply a base frequency to a desired value. This is accomplished by the non-linear capacitance of the device with changes in impressed voltage. Shifting frequencies from ion range to microwave range in the transmitter can also be achieved with the use of varactor device.

If a varactor diode is connected across the resonant circuit of an oscillator, the oscillator frequency can be altered by changing the bias voltage applied to the diode. When an audio frequency, alternating current signal is used as part of the bias voltage, frequency modulation can be achieved.

It is an object of the present invention to provide a new class of varactor devices serving at least a portion of the above described applications with a capacitor element form of construction.

It is a further object of the present invention to provide a new class of varactor devices operable in the microfarad range (0.1 to 1000 microfarads and higher) or at least a portion of such range.

GENERAL SUMMARY OF THE INVENTION

It has been discovered that certain refractory metals can be processed through normal capacitor production utilizing the oxides of those refractory metals as the capacitor dielectric and that the end product exhibits a very useful varactor action. Alternatively other valve metals can be made suitable through thermal or other suitable treatment of their oxides, in bulk form or in situ after forming as a thin film and incorporating into a varactor. The varactor so obtained in either case is only superficially comparable with the above stated prior art because the end products formed according to the present invention afford surface areas of the order of 100 to 10,000 times that of a diode type varactor. It provides larger values of capacitance than any of the prior devices and high percentage changes of capacitance per volt of bias change. Using the devices of the invention, varactor action (variation of capacitance as a function of applied bias) can be achieved with high capacitance ratios. Useful applications are afforded by the unique frequency response, temperature dependence, equivalent series resistance and bias characteristics of the devices of the invention.

The usable metals are valve metals — including the elemental valve metals chromium, iron, lead, nickel, manganese, tin, magnesium, titanium, zirconium, hafnium, molybdenum, tungsten, tantalum, columbium, vanadium and their compounds and alloys and mixtures with each other and with other metals and nonmetals. In preferred and distinctly advantageous embodiments of the invention, the metals are pulverized and sintered into compacts in the manner of processing powder to anodes in solid electrolyte capacitor production. The sintered powder compacts are anodized to form oxide films on the surface of the material and then the sintered anodes are impregnated with electrolyte and covered with a counter-electrode. A special heat treatment may be required in the course of powder processing to fix the varactor action and this will be described in greater detail below.

In another preferred embodiment of the invention, the oxides of the metal are produced and applied in a useful configuration through a coating process. That is, the oxide of the desired valve metal is prepared in bulk form and used as coating source for coating by evaporation or sputtering technique and laid down as a coating on an electrode (usually the anode in polar devices) and overlaid with another electrode (generally the cathode). Generally, an $MnO_2$ layer is placed between the oxide and one of the electrodes to reduce leakage currents. Also, metals (including elements and alloys) can be laid down as coatings on the substrate and then formed (oxidized) at their surface to create the dielectric layer. In all usage of the term "oxide" herein, the term also includes other compounds of valve metals which have dielectric properties such as nitrides, mixed oxides, oxynitrides, phosphate-oxide complexes.

The varactor devices of the present invention are utilizable in applications similar to the present applications of diode type varactors. The varactors of the present invention also open up several new applications. Among these are variable cut-off filters for audio frequency applications, as an inexpensive memory device for commercial and home mini-computers and calculators, as a frequency discriminator, a high capacitance analog of the diode varactor, a linear temperature sensor, and a variety of novel circuits which the skilled electronic engineer could devise.

In many CRL circuits, e.g., cut-off filters, the impedance ordinarily is varied through a device such as a saturable core reactor or a semiconductor operational amplifier. Such circuits can now be tuned using the variable capacitance device of the present invention. This is particularly applicable in low frequency (less than 10 kilocycles) tuned circuits, which need large capacitance at low frequencies compared to the high frequency, low capacitance circuit needs now served by diode "varactors."

The varactor of the present invention can be used as an incremental capacitor in many applications requiring feedback compensation. The varactor of the present invention could be used for making incremental capacitance adjustments of the circuit to respond to signal fluctuations.

Frequency multipliers now employing variable inductors can use the variable capacitance offered by the present invention instead.

In an impedance bridge the common means of obtaining the "balance" or "null" condition is the adjustment of a resistive element. It would be more desirable to obtain this condition with a reactive element. This invention could improve the accuracy and efficiency of LC bridges.

The varactor offers utility as a switching device, since it has separate capacitance states (as well as separate resistive states, also useful for switching). In some embodiments, the varactor will also respond to a temperature threshold sufficiently to afford a switching affect and therefore can serve as a temperature indicator. The device can also be calibrated with frequency and has utility as a frequency sensor. In this application the impedance of the device, could be switched according to the applied bias. In particular, two states are obtained. At zero bias low discrimination, an almost frequency-independent state, exists. At minus-one volt bias, the capacitance is a function of the decade frequency.

The fundamental phenomena underlying behavior of the device of the present invention are not well understood. The art has multiple theories to explain variation of capacitance in capacitors as a function of various related parameters. Extended discussion appears in a series of articles by Smyth and co-workers at Journal of the Electrochemical Society, vol. 110: p. 1271(1963); 110: 1277(1963); 111: 1331(1964); 113: 100(1966); 113: 1048(1966); 113: 1271(1966) and in the book by Young, "Anodic Oxide Films," Academic Press London (1961).

An anodic oxide film spans a conductivity range across the film thickness which varies from a value on the order of $1\times10^{-6}$ to $10^{-4}$ ohm-cm. at the interface with a metal electrode to a value at an insulating region of $1\times10^{+6}$ to $10^{+12}$ at an insulating portion thereof (usually the opposed face in case of a polar capacitor (incorporating such thin film).

The intervening conductivity profile may be uniformly sloped or very nearly stepped. One common conceptual model of capacitance attributes bias induced capacitance changes, when they occur, to a bias induced change of the conductivity profile which provides an apparent "movement" of effective electrode spacing — capacitance being inversely proportional to such spacing. Another model attributes such changes to an alteration of relaxation times within the semiconducting region of the oxide (i.e., the characteristic time interval required for electrons to approach equilibrium distribution after perturbation by an applied electric field.)

Neither model is wholly usable, other than for broad simplification, to explain the behavior of the present device.

The varactor behavior does coincide, in preferred embodiments, with materials selections and/or treatments which enlarges the deficit of oxygen to increase the slope of an oxygen content gradient across the film thickness. Oxides (such as molybdenum oxide) of low bonding strength mixed with oxides (such as niobium oxide) which can form physically stable thick films or single oxides meeting both criteria are employed. The oxide or mixed oxide has a low diffusivity to oxygen so that oxide deficit is readily induced. Excess electrons in the oxygen deficient region are drawn toward the anode electrode when a bias is applied to alter conductivity profile across the oxide film thickness.

The same effect, qualitatively, can be achieved by mixing metals of different valence in the oxide and establishing synthetic oxygen deficit and thereby electron excess through metal atom displacement. But this mechanism proceeds best in ordered lattice structures and is less effective in the amorphous valve metal oxide structures utilized here.

In prior art tantalum studies, the changing-bias-induced variation of capacitance is small but fixed. In prior art niobium studies greater variations of capacitance with bias changes are observed, but are associated with structural damage and are not usable as a reliable device. The prior art therefore regards the limited capacitance change as a problem rather than a usable parameter.

The present invention affords a device with a usable capacitance change characteristic. The range of available capacitance change is also enhanced in through the invention.

The varactor device of the present invention is characterizable through its basic capacitance level, its metal oxide film thickness and Capacitance Ratio — all of which are known and measurable capacitor device parameters.

The ultimate performance feature to be obtained in most varactors is voltage-bias responsive capacitive change.

The basic capacitance levels obtainable with varactor devices are in the microfarad range (0.01 to 1000 microfarads) and higher. It is of course also possible to make a reduced size varactor according to the present disclosure with resulting picofarad or nanofarad capacitance levels. But the utilization of the present invention in connection with capacitances of at least 0.01 microfarads is preferred and distinctly advantageous and in the context of high change voltage-biasresponsive capacitive change devices affords a distinct new capability to the art because of its solid state capacitance tuning capability.

The oxide film thickness is 20 Angstroms to 0.1 mils. This is in contrast to the tunneling devices, such as the alumina film devices cited above which have lower thickness, and in contrast to the barium titanate devices and the like which have a minmum dielectric layer thickness of about 3 mils.

The so-called M.I.S. devices, described in Proceedings of the I.R.E. 47:2011 (Nov. 59) and Bell System Technical Journal 41:803 (May, 62) and U. S. Pat. No. 3,613,011 have metal-insulating-semiconductor-metal layers and are used as varactors. These afford capacitance levels on a picofarad-nanofarad level and their performance is dependent on thickness of the semiconductor layer. Operation of such devices is similar to that of the diode varactors; increasing the space charge depletion region of the semiconductive layer through modification of the electric field acting thereon (i.e., upward change of bias voltage applied to the varactor device) effectively increases the distance between device electrodes (the metal layers) to decrease capacitance. In devices of the present invention, the usual insulating oxide layer of a capacitor is modified to display mixed insulating — semiconductive characteristics, and this is the predominant locus of varactor action. Devices of the present invention may add a semiconducting and leakage-current-blocking layer which is semiconductive; but the added layer does not significantly modify the varactor action of the valve metal oxide film.

Capacitance Ratio is the ratio of maximum to minimum capacitances in the capacitance-voltage characteristic curve of a capacitor. Maximum capacitance usually occurs at reverse breakdown voltage and minimum capacitance usually occurs at forward breakdown voltage.

The device exhibits a useful change of capacitance with temperature. Though similar devices are shown U. S. Pat. No. 3,568,010, the present invention affords considerably greater sensitivity to temperature.

Other objects, features and advantages of the present invention will become apparent from the following detailed description of preferred embodiments, taken in connection with the accompanying drawings, in which,

DETAILED DESCRIPTION OF PREFERRED EMBODIMENTS OF THE INVENTION

Figure 1:
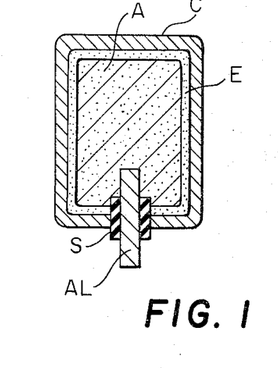
FIGS. 1, 1A, 1B, and 1C are diagrammatic cross sections of embodiments of varactor devices.

Referring now to FIG. 1 of the drawings, there is shown a varactor device according to a species of the invention suitable for high capacitance (microfarad range) applications, such as in control circuits for relays and/or home appliances. The device comprises a porous anode A made of a compacted valve metal powder (preferably compacted through pressing and sintering) which has a porous interior network lined by a surface oxide layer of the valve metal.

The valve metal powder is preferably a niobium-molybdenum binary alloy in the range of 15–85 to 85–10 atomic percent of the respective components.

Other suitable materials are molybdenum-titanium, zirconium-titanium, vanadium-titanium and niobium-vanadium binary allows and zirconium -titanium molybdenum ternary alloys. There are the most suitable materials for high breakdown voltage applications. Still further materials, which are less suitable per se, but which can be made as suitable through special treatment, can be employed. For instance, elemental niobium is unsuitable. But formation of a niobium oxide film on the niobium surface in a concentrated phosphoric acid and subsequent heating at 300°C for an extended period (1–3 hours) results in an oxide film exhibiting useful varactor action. Also, the variable capacitance response characteristic of most materials is enhanced by such treatment. The heat treatment may also be carried out in a vacuum or in a partial vacuum oxygen atmosphere or in other gas mixtures containing oxygen. This tends to enhance the varactor action.

In low voltage breakdown applications, the valve metal could be iron, chromium, manganese, lead or nickel. Aluminum, with heat treatment of the type described above for niobium — but with higher temperature would also serve.

A lead wire AL is attached to the anode by butt welding or compacting with the anode as indicated in FIG. 1. The wire AL passes through a seal S. The oxide film (or mixed oxide film in the case of alloys) is formed on the interior of the porous anode by conventional aqueous bath electrical anodization techniques. Typical formation conditions are indicated in the Examples below.

A still further aspect of processing which enhances varactor action is formation condition. Formation in concentrated electrolytes (e.g., 85% $H_3PO_4$ solution) gives distinctly advantageous enhanced varactor action compared to formation in conventional dilute electrolytes (0.1% $H_3PO_4$) used in formation of fixed value capacitors.

The porous formed anode is filled with a solid conductive electrolyte E such as manganese dioxide through inpregnation with a liquid precursor (manganese nitrate solution) and pyrolysis in-situ.

A cathode electrode C is put in contact with the electrolyte and the device is packaged in conventional fashion to form a complete electrical component.

Contacting to the cathode may be done by a separate CL lead or grounding contact with a circuit chassis.

Figure 1A:
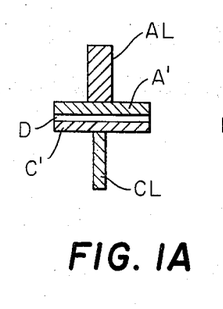

FIG. 1A shows another form of varactor device comprising a cathode C. dielectric oxide layer D and anode A and anode lead AL and cathode lead CL. Such a device may be formed of separate sheets or the oxide may be formed on the surface of a valve metal anode material. Preferably a $Mn O_2$ conducting layer is formed between dielectric and cathode layers.

FIG. 1A devices can also be formed on a micro-scale through coating techniques using evaporation and/or sputtering material transfer techniques. The anode could be formed of a sputtered valve metal in a sputtering technique ending in a reactive sputtering step to form the oxide. Alternatively the oxide can be prepared in bulk form as a sputtering target and applied through sputtering for use between non-valve metal or valve metal electrodes. Leads AL and CL can be replaced by the flat or internal interconnection means well known in the micro-circuit field.

The flat sheet configuration of the FIG. 1A species is particularly amenable to large scale economical manufacture through production of large sheets which can be diced to chips of desired area.

Sheet form varactors can be made of spirally wrapped foils, with oxide surface area enhancement obtained through use of anode foil etching or like techniques known in the capacitor art.

Figure 1B:
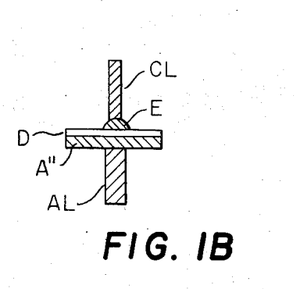
Figure 1C:
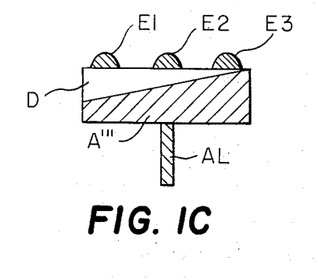

FIG. 1B shows a small micro-contact varactor with a manganese dioxide solid electrolyte dot D deposited on the dielectric oxide film layer on an anode A surface. The cathode lead CL makes point contact with the manganese dioxide. FIG. 1C shows a variant species with a graded thickness dielectric layer D and multiple electrolyte dots E1, E2, E3 which can be selectively contacted to afford a choice in nominal capacitance levels and varactor action levels.

In FIG. 1A, a solid conducting electrolyte layer $MnO_2$ can be inserted between layers D and C to afford lower leakage currents and increased reverse voltage breakdown level. Polar devices of FIGS. 1, 1B, 1C can be made bi-polar by back-to-back arraying.

VARACTOR SYSTEMS

Figure 2:
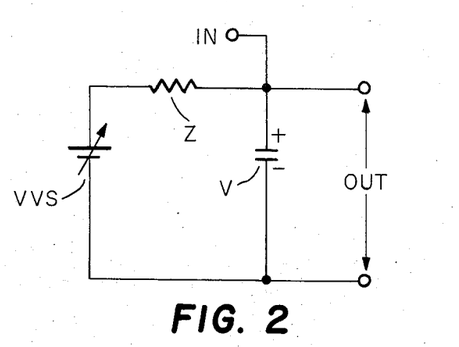
FIGS. 2, 2A, 2B and 2C are circuit diagrams of electrical systems incorporating voltage variable capacitance elements in accordance with the present invention.

FIG. 2 shows a generic circuit application with input and output terminals connected across a varactor V with a high impedance variable voltage source VVS providing a control bias to the varactor. Typically the FIG. 1 varactor device would serve as V and the circuit of FIG. 2 would be a high fidelity noise reduction circuit taking in an input signal of 10,000 Hz, with the high end to be attenuated. The variable voltage source would vary bias from zero to minus one volts D.C. In the zero volt mode there would be no compensation. In the minus one volt mode, capacitance shift would occur from 0.175 microfarads base value to 0.325 microfarads at the high frequency, lowering the amplitude of the higher frequency portions of the input signal.

In some instances the voltage bias might be built into the signal itself, such as in the case an antenna circuit. The varactor V would be used as a trimmer capacitor.

Figure 2A:
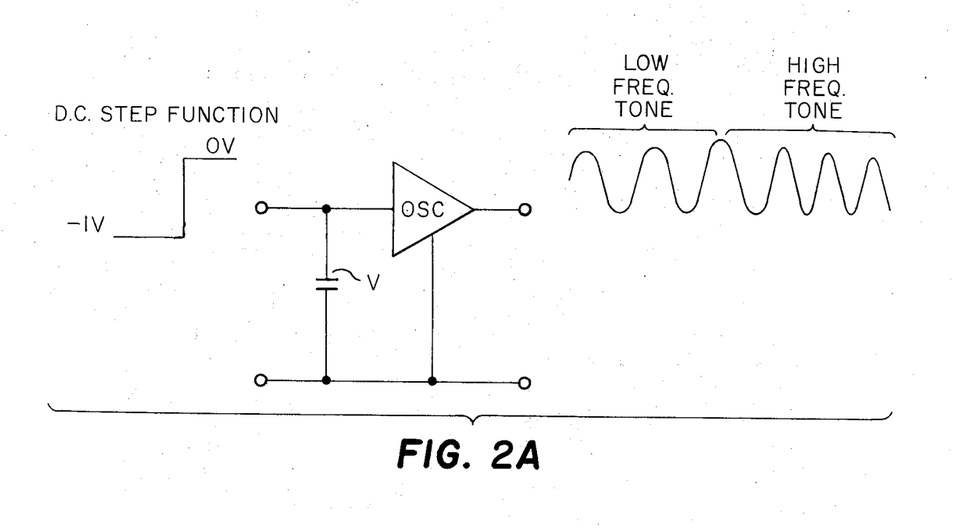
Figure 2B:
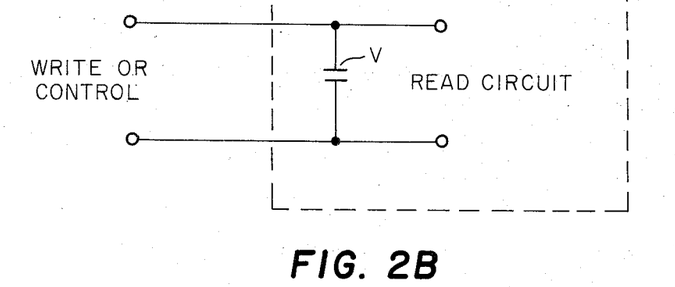
Figure 2C:
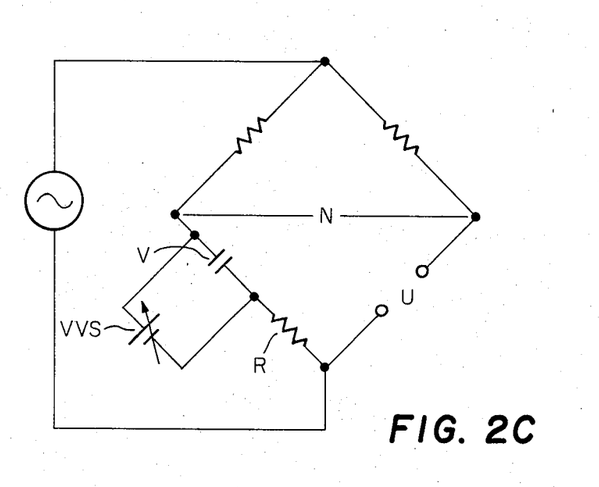

FIG. 2A shows the varactor V in a frequency modulation circuit controlling an oscillator to produce a modulated pattern of oscillations in response to low frequency (D.C. step) modulation input function. FIG. 2B shows a memory circuit with the varactor hooked up between a voltage source write or control circuit and a read circuit and accessed in a manner analogous to operation of ferrite core array memory. FIG. 2C shows a capacitance measuring Wheatstone bridge using the varactor V and its high impedance variable voltage source VVS as well as a variable resistor R to null out an unknown capacitor connected at V. This bridge can read equivalent series resistance and capacitance directly.

The practice of the invention is now illustrated through the following non-limiting examples.

EXAMPLE 1

An anode layer was prepared through sputtering from a high molybdenum Nb-Mo alloy target to produce a coating of essentially the same alloy proportions on a substrate glass slide. The coating was provided with an anode contact and anodized in 0.1 percent phosphoric acid bath at 250°C, forming to 50 volts. The coated and formed slide was heated in air for half an hour at 300°C and then cooled and immersed in a wet cell with 1 percent phosphoric acid electrolyte. The cell was wired into a standard capacitance bridge circuit and tested for capacitance at different DC bias voltages.

Figure 3:
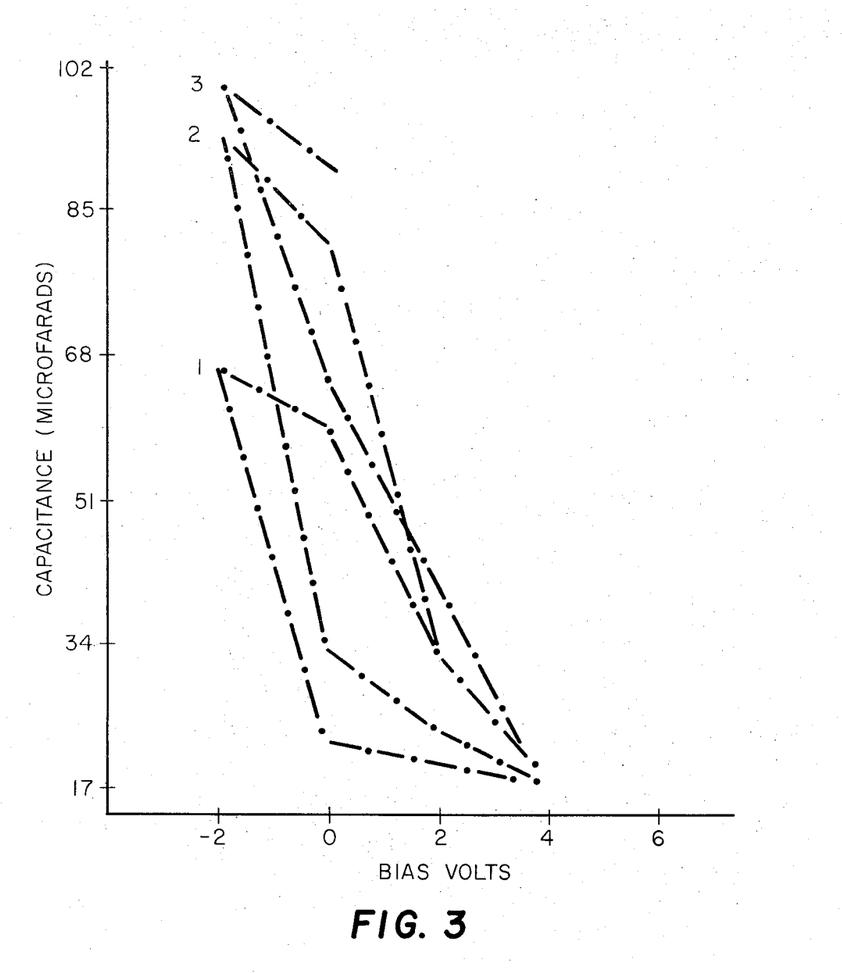
FIGS. 3–7 are curves showing the performance of varactor elements made and tested as set out in the examples given below.
Figure 4:
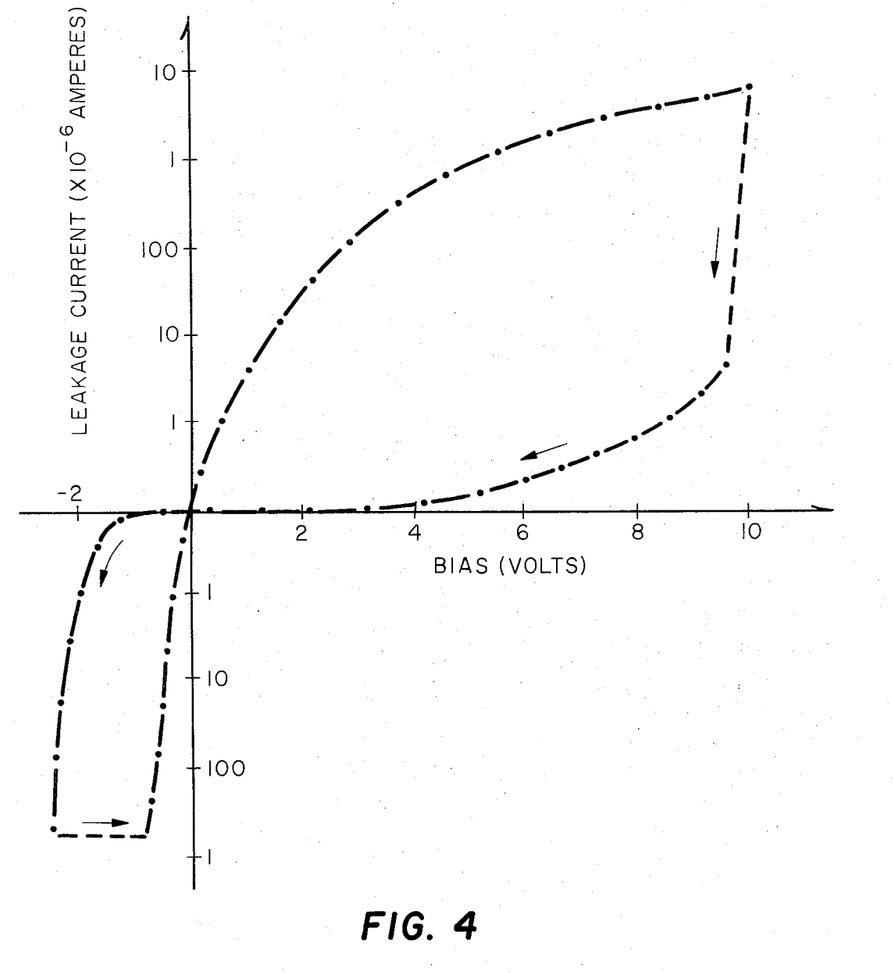

The capacitor had an initial capacitance of 0.226 microfarads before the above heat treatment. After heat treatment, the capacitance was 34 microfarads at zero bias volts. Thus the thermal $\Delta C$ with heating to 300°C was 1500 percent. The resultant capacitance readings are illustrated in FIG. 3 which shows hysteresis loops 1, 2 and 3 (partial) in a plot of capacitance versus bias voltage. The voltage bias responsive capacitance change is 120 percent per volt between zero and minus two volts in loop 2, and the capacitance difference is large enough to provide an electrical switching action. Leakage currents and dissipation factors were high and displayed a large hysteresis characteristic, as illustrated in FIG. 4. Similarly, dissipation factor was in the range of 200 to 400 percent at plus bias voltages and 400–800 percent at minus bias voltages.

EXAMPLE 2

Figure 5:
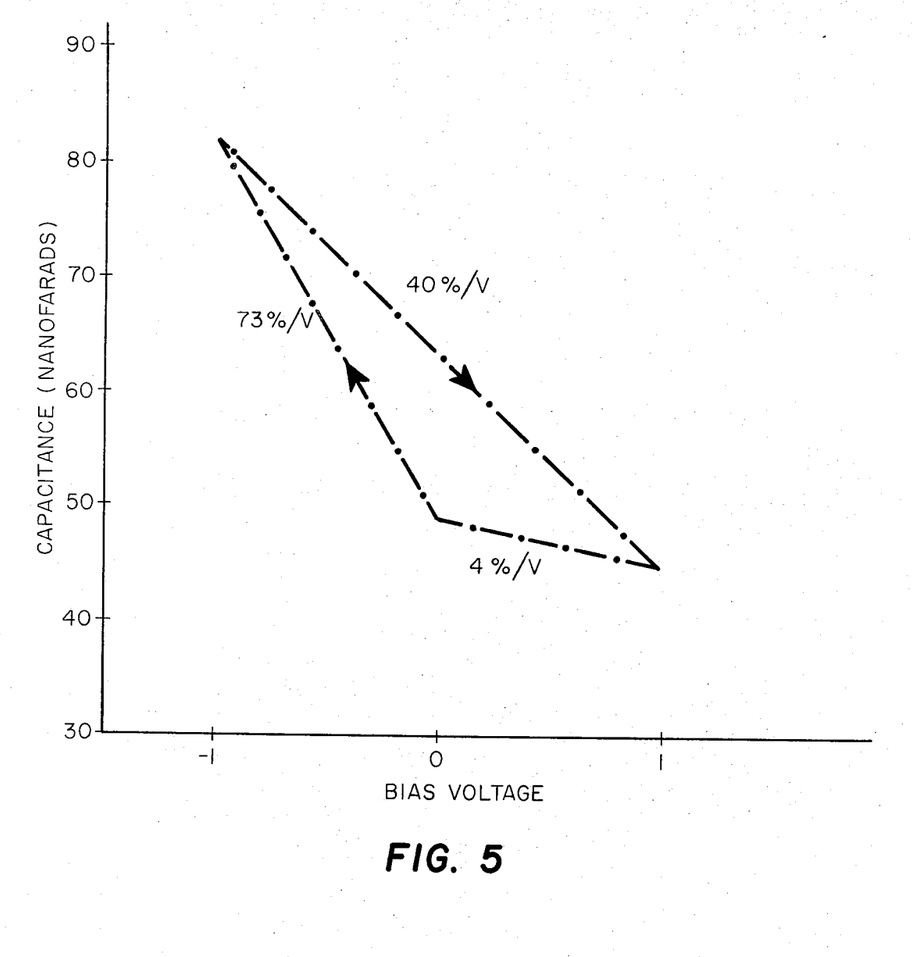

An alloy of 60 a/o Nb-40a/o Mo was fabricated to a button slice 1 cm. thick, polished and formed to 50 volts in 85% $H_3PO_4$ at 25°C. It was heated to 300°C in air for ½ hour and tested under standard test conditions, as described below, and found to have a thermal $\Delta C$ of 2900 percent. It was processed to a solid capacitor, as shown in FIG. 1B, reformed to 5 volts and tested for capacitance at 55°C with bias voltages applied in a sequence of zero, +1, −1, zero. The resultant capacitances are plotted in FIG. 5. Repeated testing showed a consistent approximation of behavior exhibited in FIG. 5. Connecting lines between points plotted at +1, Zero and −1 volts are arbitrary and not necessarily representative of exact curve shape. Leakage was less than 5 microamperes.

Figure 6:
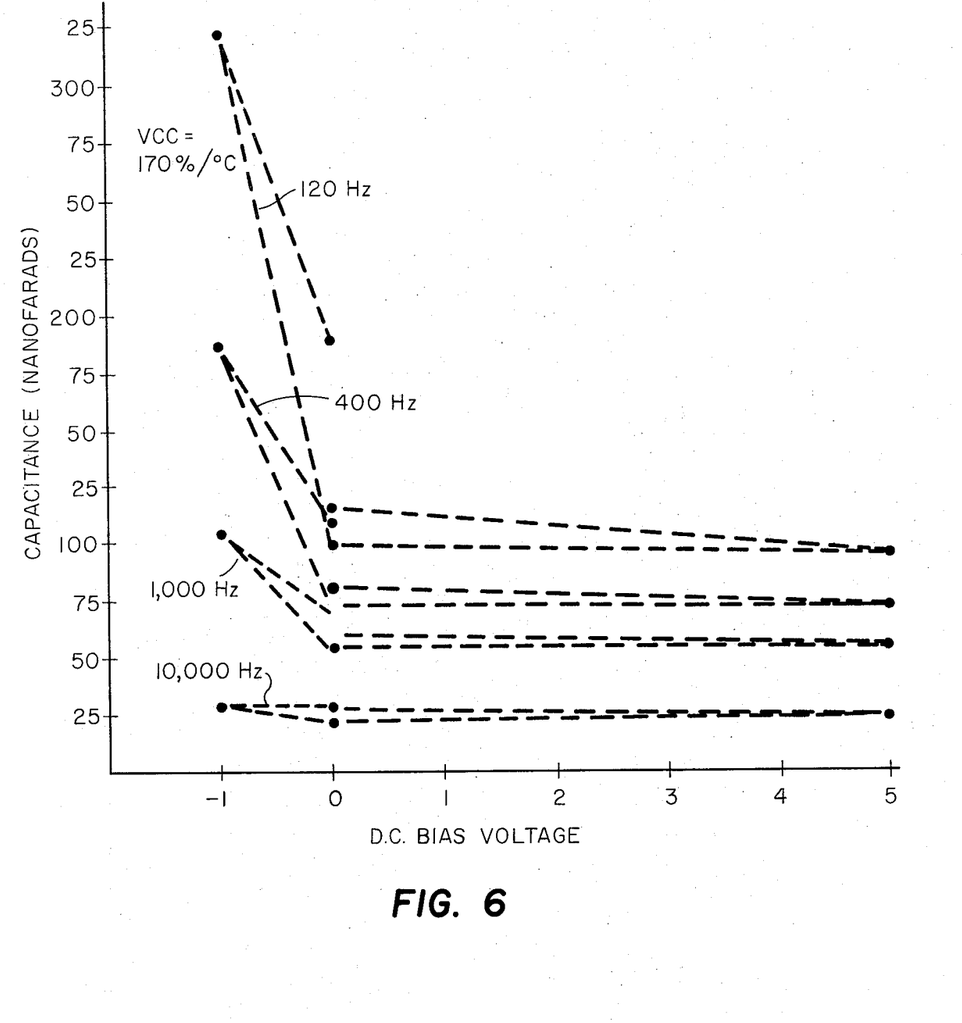

EXAMPLE 3:

Buttons, formed and $\Delta C$ tested and processed to solid capacitors as in Example 2, had a thermal $\Delta C$ of 2900 percent. They were tested at different frequency levels cycling from zero to 5 volts and then to zero, then −1 volts D.C. bias, then back to zero. FIG. 6 shows the resultant frequency-dependent varactor action.

EXAMPLE 4

Buttons were processed as in Examples 2 and 3, affording a thermal $\Delta C$ of 750 percent – 850 percent.

Figure 7:
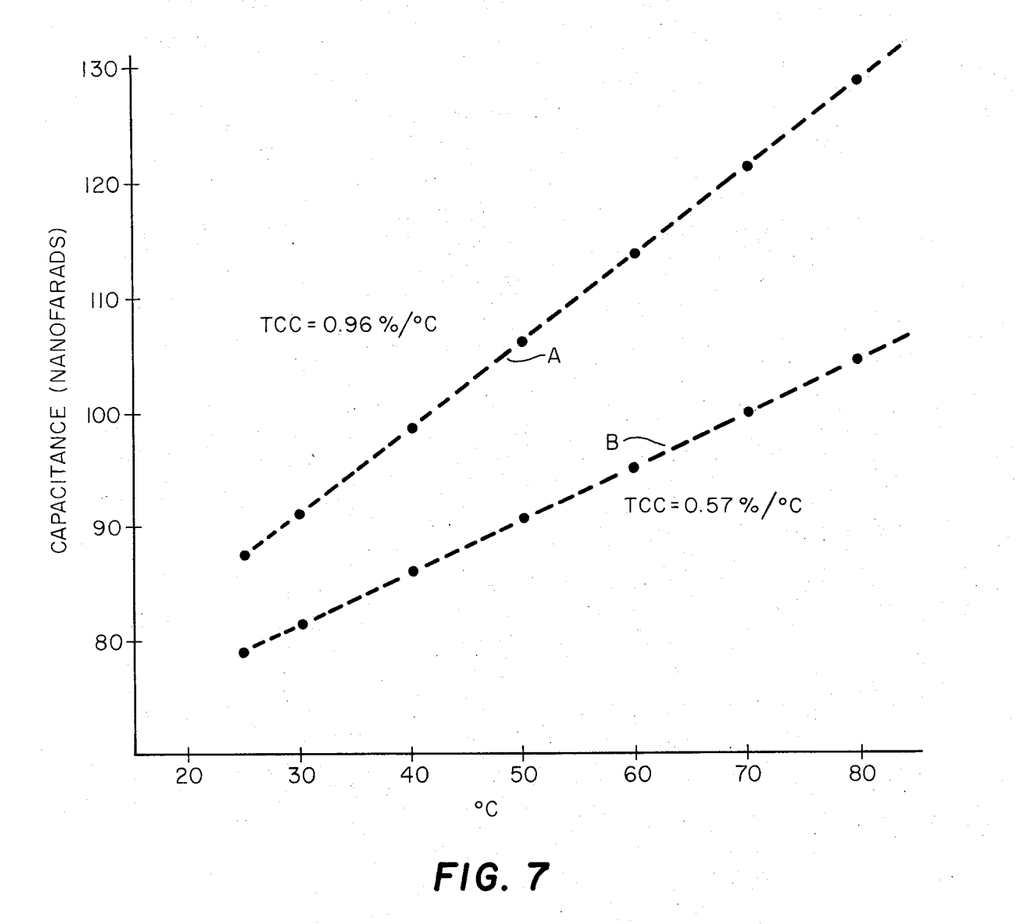

An unreformed sample A and a sample B (reformed to 5 volts) where tested for temperature dependence of capacitance with the results shown in FIG. 7.

The correlation is found to be strong between thermal $\Delta C$ characteristic and effective voltage bias responsive capacitance change for purposes of the present invention and the varactors of the present invention may also be characterized in that way.

Thermal $\Delta C$ is measured immediately subsequent to initial formation of the dielectric layer. The formed dielectric layer is heated to 300°C for at least half an hour. Capacitance is tested before and after heating and the change ($\Delta C$) is observed as $$\Delta C = C_1 - C_2/C_2 \times 100 \text{ percent}$$

Where $C_1$ is capacitance after heating and $C_2$ is capacitance before. This is herein after referred to as Standard Thermal Testing Conditions.

A varactor within the scope of the present invention is one which displays a thermal $\Delta C$ of at least 50 percent and preferrably 1000 percent. There is no theoretical maximum but the higher end of the range of observed thermal $\Delta C$ has been of the order of 10,000 percent.

In most cases, the steps of the Standard Thermal Test Condition itself build in the desired varactor action. However, the necessary dielectric layer structure could be built in during formation and the steps of the Standard Thermal Test Condition would not substantially change the varactor action per se. Non-thermal treatments to build in the bias voltage responsive capacitance change characteristic (and, coincidentally, the thermal $\Delta C$ characteristic) are formation of dielectric oxide film in high concentration acids (e.g., 85 percent phosphoric acid) or in a flowing acid solution with changing concentration during the course of formation.

Where thermal treatments are used to fix the varactor action, the 300°C temperature is suitable for the molybdenum-niobium alloys of the preceding Examples. Higher temperatures would be necessary for valve metals having more stable oxides such as tantalum and lower temperatures could be used for valve metals having less stable oxides.

It is believed that the varactor action is produced by a multi-layered (including continuous spectra) oxide film with differences in stoichiometry across the total thickness, resulting in differences in dielectric constant and conductivity. Internal polarization conditions across the multiple internal layers are variable adjusting D.C. or low frequency A.C. bias fields to alter the effective capacitance of the oxide film as a whole.

It is evident that those skilled in the art, once given the benefit of the foregoing disclosure, may now make numerous uses and modifications of and departures from the specific embodiments described herein, without departing from the concept of the invention. Accordingly, the invention is to be construed as embracing each and every novel feature and novel combination of features present and/or possessed by the apparatus and techniques herein disclosed.

What is claimed is:

1. A bias voltage-responsive, variable capacitance device comprising, a first electrode, a counter electrode opposing said first electrode and being closely spaced therefrom, a dielectric layer between said electrodes comprising a solid, electrolytically formed, thin film of a non-stoichiometric valve metal oxide of a thickness of 20 Angstroms to 0.1 mils, and providing in combination with said electrodes a Capacitance Ratio of at least 2 and a capacitance of at least 0.01 microfarads, and wherein the said valve metal oxide is a non-stoichiometric oxide of a valve metal selected from the group consisting of intermetallic compounds and alloys comprising at least first and second components, both of which are selected from the group consisting of niobium, molybdenum, tantalum, titanium, tungsten, zirconium and vanadium.

2. The device of claim 1 wherein the said Capacitance Ratio is at least 10.

3. The device of claim 2 having a Thermal $\Delta C$ of at least 50 percent when measured under Standard Thermal Test Conditions.

4. The device of claim 1 wherein the said first electrode is in the form of a porous block of the said valve metal and has interior pores lined with surface oxide of the said valve metal.

5. The device of claim 4 wherein the second electrode is electrically connected to the said oxide via a conducting solid electrolyte layer.

6. The device of claim 1 wherein the first electrode is in the form of a flat layer at least portially overlaid with said valve metal oxide.

7. The device of claim 6 wherein the first electrode is made of said valve metal.

8. The device of claim 6 wherein a solid conductive layer at least partially overlays said oxide.

9. A bias voltage-responsive, variable capacitance device comprising, a first electrode, a counter electrode opposing said first electrode and being closely spaced therefrom, a dielectric layer between said electrodes comprising a solid, electrolytically formed, thin film of a non-stoichiometric valve metal oxide of a thickness of 20 Angstroms to 0.1 mils, and providing in combination with said electrodes a Capacitance Ratio of at least 2 and a capacitance of at least 0.01 microfarads, and wherein the valve metal oxide is the oxide of niobium-molybdenum alloy containing 60 atomic percent niobium and 40 atomic percent molybdenum and the first electrode is made of said alloy.

* * * * *